United States Patent [19]

Gustafson

[11] 4,238,464
[45] Dec. 9, 1980

[54] AIR REVITALIZATION MATERIALS

[75] Inventor: Paul R. Gustafson, Oxon Hill, Md.

[73] Assignee: The United States of America as represented by the Secretary of the Navy, Washington, D.C.

[21] Appl. No.: 932,233

[22] Filed: Aug. 9, 1978

Related U.S. Application Data

[63] Continuation-in-part of Ser. No. 790,624, Apr. 25, 1977, abandoned.

[51] Int. Cl.³ .............................................. C01B 35/10
[52] U.S. Cl. .................................. 423/230; 423/277; 423/279; 423/281; 423/283; 423/579; 423/593; 423/598; 252/186
[58] Field of Search ............... 423/230, 277, 281, 579, 423/593, 598, 279–280, 283, 581–583; 252/184, 186, 192, 182

[56] References Cited

U.S. PATENT DOCUMENTS

| | | | |
|---|---|---|---|
| 1,697,929 | 1/1929 | Ryan | 423/598 |
| 1,978,953 | 10/1934 | McKeown | 423/281 |
| 2,851,334 | 9/1958 | Bretschneider | 423/281 |
| 2,937,998 | 5/1960 | Habernickel | 252/186 |
| 3,755,553 | 8/1963 | Kutolin et al. | 423/598 |
| 3,847,837 | 11/1974 | Boryta | 252/184 |
| 3,920,803 | 11/1975 | Boryta | 252/186 |
| 4,026,811 | 5/1977 | Readey et al. | 423/598 |
| 4,087,511 | 5/1978 | Ropp | 423/277 |

*Primary Examiner*—Earl C. Thomas
*Attorney, Agent, or Firm*—R. S. Sciascia; Philip Schneider; Thomas McDonnell

[57] ABSTRACT

Revitalization of air by circulation thereof through a quantity of a salt of zirconium, titanium or boron and oxygen in the peroxide or higher positive valence state and by mixtures thereof with an alkali metal or alkaline earth hydroxide, oxide, peroxide, superoxide, or ozonide or mixture thereof.

14 Claims, 2 Drawing Figures

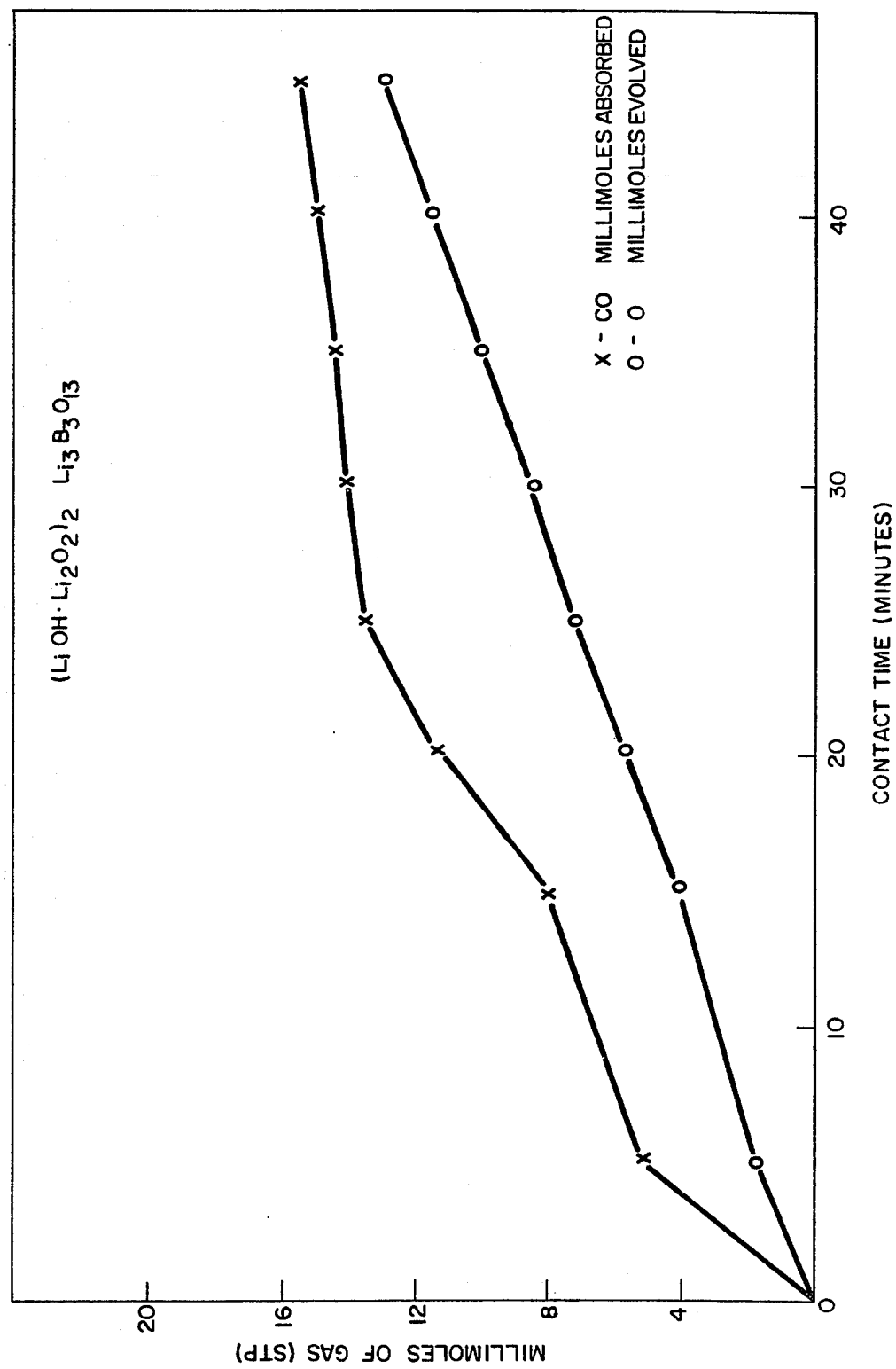

AIR REVITALIZATION MATERIALS

CROSS REFERENCE TO RELATED APPLICATION

This application is a continuation-in-part of application Ser. No. 790,624 filed Apr. 25, 1977, and now abandoned.

BACKGROUND OF THE INVENTION

The invention pertains generally to production of oxygen and absorption of carbon dioxide and in particular to air-revitalization materials.

Fundamentally, a closed-circuit emergency breathing device supplies oxygen to the breathing air and removes carbon dioxide from the air. One approach has been to combine heavy bulky air or oxygen cylinders with canisters containing caustic alkali or soda lime for carbon dioxide removal. Another approach has been to use a compound or composition which chemically supplies oxygen and absorbs carbon dioxide.

For a compound or composition to be useable for the purpose of both absorbing carbon dioxide and producing oxygen, the compound or composition must be inexpensive and readily obtainable and have a high rate of carbon dioxide absorption and oxygen evolution, an $O_2/CO_2$ ratio of approximately one, a low rate of heat evolution, a low toxicity, a high degree of safety, and a low requirement for humidity and temperature for oxygen effervesence with a high threshold for fusion due to humidity or temperature.

Potassium superoxide is the most widely used material for air revitalization. It represents the best compromise known today. The disadvantages of potassium superoxide are fusion, a large heat evolution, causticity, a high $O_2/CO_2$ ratio, and a poor overall efficiency. Fusion is the major disadvantage. In many cases, only 50–60% of the potassium superoxide is useable because of fusion. If fusion could be eliminated, the useable work period could be extended nearly twofold. Elimination of fusion would also permit a change in canister design to a simpler configuration.

SUMMARY OF THE INVENTION

It is therefore an object of this invention to provide a replacement for potassium superoxide as an air-revitalization material.

Another object of this invention is to provide an air-revitalization material which is more resistant to fusion than potassium superoxide.

And another object of this invention is to provide an air-revitalization material which is mixable with potassium superoxide.

A further object of this invention is to provide an air-revitalization material which is inexpensive and readily obtainable.

A further object of this invention is to provide an effervescent source of oxygen.

A still further object of this invention is to provide a source of oxygen which has a low toxicity.

These and other objects are achieved by salts containing one of the three metals, zirconium, titanium, or boron and oxygen in the peroxide or higher positive valence state or a mixture thereof, or by these salts in combination with inorganic bases selected from the group consisting of alkali metal or alkaline earth hydroxide, oxide, peroxide, superoxide or ozonide.

BRIEF DESCRIPTION OF THE DRAWINGS

The testing and effectiveness of the present invention are better understood from the following description when read in conjunction with the accompanying drawings in which:

FIG. 2 is a set of curves depicting the result of absorption of carbon dioxide from a sample of air as a function of time and the evolution of oxygen as a function of time.

DETAILED DESCRIPTION OF THE INVENTION

Figure 1:
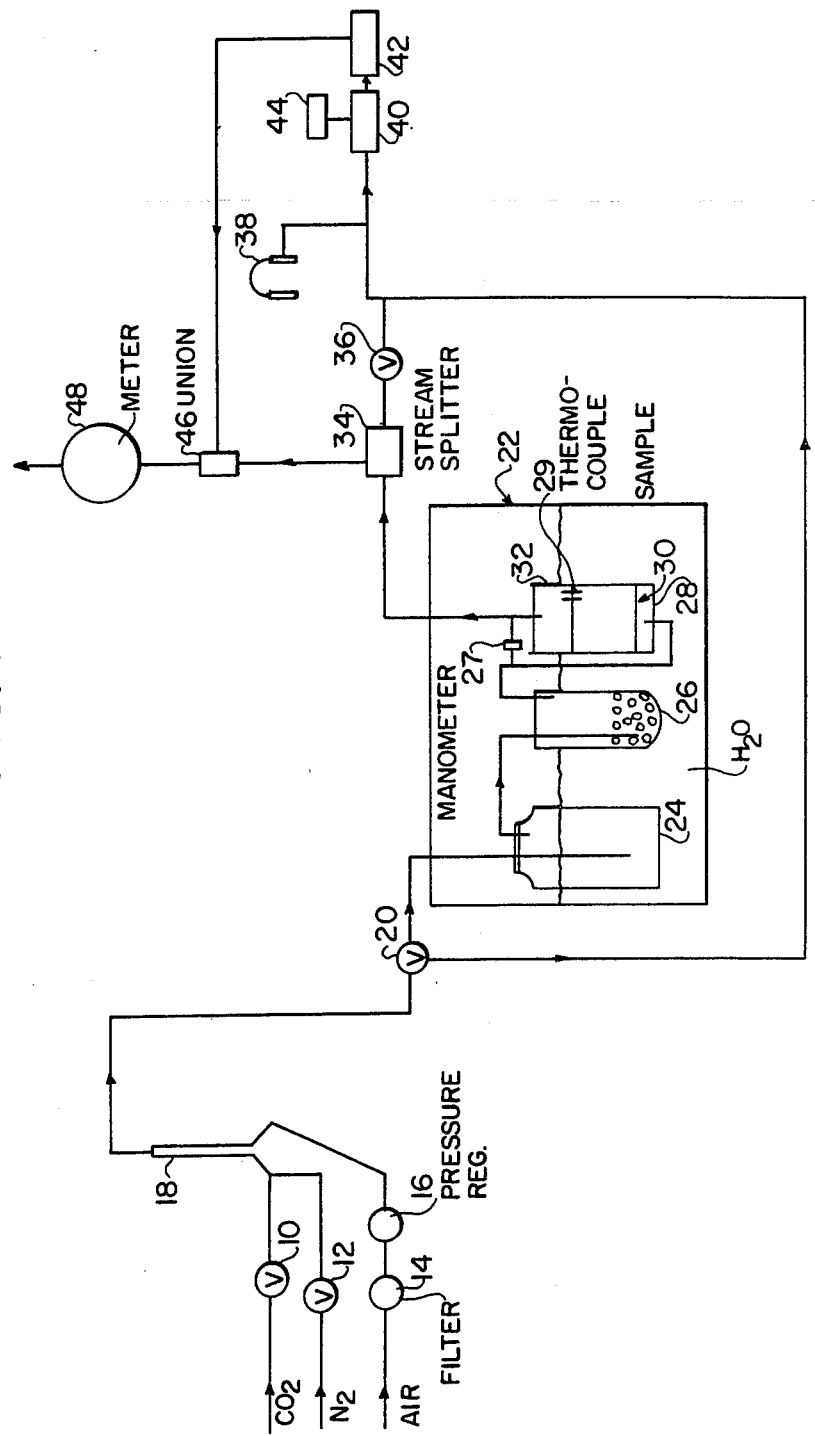
FIG. 1 is an apparatus for testing air revitalization materials for carbon dioxide absorption and oxygen evolution.

The compounds embraced by the practice of the present invention are described in more detail by the following formula: $A_mZ_n(D_xO_yH_z)p$ wherein A is a base having a lithium, magnesium or calcium cation and an oxide, hydroxide, peroxide, or superoxide anion; Z is calcium, lithium, sodium, or potassium (these cations readily combine with the DOH group); D is boron, zirconium, or titanium; O is oxygen having any valence but at least one oxygen in the DOH group has a valence greater than (−2), e.g. (−1); H is hydrogen; m is 0 or 1; n is an integer from 1 to 4; p is an integer equaling 1 to 2; x is an integer from 1 to 3; y is an integer from 2 to 13; and z is an integer from 0 to 3. The bases which are preferred on the criteria of effectiveness, cost, and availability are lithium hydroxide, sodium hydroxide, potassium peroxide, potassium hydroxide, calcium peroxide, magnesium hydroxide, and calcium hydroxide. The bases act to increase the effectiveness of the compound to absorb carbon dioxide.

The preferred subgroup is the boron compounds. These compounds have the general formula: $A_m \cdot Z_n(B_xO_yH_z)p$ wherein the symbols have the same designations and values as previously. To better describe these compounds, the following expanded formulas of specific examples are given.

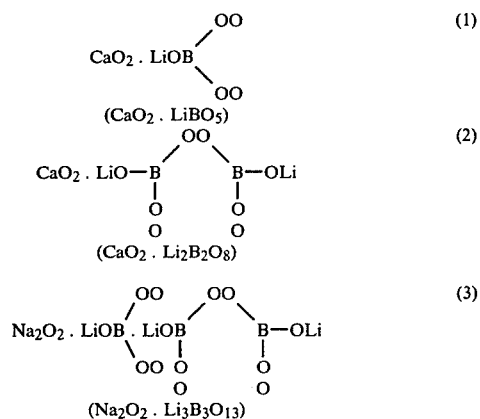

On the basis of oxygen generation or oxygen generation and carbon dioxide absorption, the preferred members of the "boron" subgroup are:

$CaO_2 \cdot LiBO_5$, $Na_2O_2 \cdot LiBO_5$, $CaO_2 \cdot Li_2B_2O_8$, $Na_2O_2 \cdot Li_3B_3O_{13}$, $Na_2O_2NaBO_5H$, $Na_2O_2 \cdot NaBO_5$, $KO_3 \cdot NaBO_5$, $KO_3 \cdot NA_2B_2O_8$, $KO_3 \cdot Li_2B_2O_8$, $KO_3Li_3B_3O_{13}$, $KO_3LiBO_5$, $Ca(OH)_2Ca(O_2)_2 \cdot NaBO_5$, $(LiOH)_2 \cdot LiBO_5$, $(LiOH \cdot Li_2O_2)_2 \cdot Li_3B_3O_{13}$, $(Li_2O_2)_2$-

.Li$_2$B$_2$O$_8$. Other compounds which are particularly effective are Ca$_2$ZrO$_8$ and Ca$_2$TiO$_8$.

It is possible to admix these compounds with presently used revitalization materials, e.g., potassium superoxide. The compounds of this invention are used in the same manner as other effervescent revitalization materials. Basically, the compounds must be in contact with at least a stoichiometric amount of water vapor in order to have maximum oxygen production. Heat may also be used. In heating the compounds, a temperature not in excess of 10% of the Celsius temperature at which oxygen begins to evolve should be used for the lithium compounds. Many of these compounds become unstable at elevated temperatures. Hence the temperature should not exceed 115° C. and preferably not exceed 105° C. As a safety precaution, each batch of a lithium compound should be carefully checked for thermal stability. The compositions of the present invention can function with amounts of water up to 5 mg of water/min/gm of sample.

The preparation of these compounds are exemplified by the following examples. The method of the examples can be divided into two categories. Examples I to III involve the first method which comprises thoroughly mixing two metallic salts, forming a mono-or diperoxyhydrate with the cations of the salts by a reaction of the salts with hydrogen peroxide, and slowly dehydrating in vacuum the peroxyhydrate at low temperatures in order to form the present high-oxygen-containing compounds. The other method comprises thoroughly mixing a metallic salt or hydroxide (an acid H$_3$BO$_3$), forming a mono-or diperoxyhydrate with the salt cation by a reaction with hydrogen peroxide, and slowly dehydrating in vacuum the peroxyhydrate at low temperatures in order to form the present high-oxygen-containing compounds. The ingredients are added in stoichiometric amounts except for hydrogen peroxide which is added in an excess (15 to 300% in excess.) Essentially, the methods are an advancement over the method disclosed in Fathallah and Partington. *New Alkali Metal Perborates.* In Nature 164 (4179): p. 952-3 Dec. 3, 1949).

EXAMPLE I

Ca(OH)$_2$Ca(O$_2$)$_2$.NaBO$_5$

One-tenth mole of calcium peroxide octahydrate (CaO$_2$.8H$_2$O) and 0.05 mole of sodium perborate (NaBO$_3$.4H$_2$O) were ground together to break-up any agglomerations and to thoroughly mix the two salts. The materials were transferred to a thick-walled glass flask which was placed in an ice bath (−5° C.). One-half mole of a 50% aqueous hydrogen peroxide solution was slowly added to the mixture. A vacuum was applied to the mixture while the mixture was stirred by a magnetic stirrer.

After 72 hours, the temperature was slowly raised (3° C./hr) to 13° C. A small sample was taken and was analyzed for effervescent oxygen and peroxide oxygen. The respective amounts were about 0.5% and 23%.

Vacuum dehydration at 3 microns mercury and at 0° C. was continued for 10 days. Then the temperature was raised (2° C./hr) to 25° C. and the vacuum drying was stopped.

The color of the product was a deep lemon yellow. A second analysis of the material showed an effervescent oxygen content of about 22% by weight and a peroxide oxygen content of about 9.2%. As before, the effervescent oxygen content was determined by adding a known amount of water to a known amount of material and weighing the wetted material after the bubbling stops.

EXAMPLE II

Ca$_2$ZrO$_8$

One-twentieth mole of ZrO$_2$ and one-tenth mole of CaO$_2$.8H$_2$O were mixed and ground in a mortor. The mixture was transferred to a thick-walled glass flask which was placed in an ice bath (−5° C.). Thirty percent aqueous H$_2$O$_2$ in an amount of 1.1 moles was slowly added to the mixture. The mixture was stirred with a magnetic stirrer for one hour. The mixture was dehydrated by vacuum (final vacuum (10 μHg). Fifty percent aqueous hydrogen peroxide in an amount of ½ mole was added to the dried mixture and the mixture was stirred for one hour at 0° C. The temperature was lowered to −4° C. and a vacuum (final vacuum, 5 μHg) was applied for 8 days before the temperature was raised to 15° C. over 72 hours. The vacuum was continued for three days while the temperature was raised to 25° C. Raising the temperature slowly in two steps (to 15° C. and to 25° C.) allowed the diperoxyhydrate to react at a moderate rate, thereby minimizing the risk of a rapid decomposition.

This material was a lemon yellow. Analysis showed that the effervescent oxygen content was about 12% and the peroxide oxygen content was 6% by weight.

EXAMPLE III

Ca$_2$TiO$_8$

One-twentieth mole of TiO$_2$ and one tenth mole of CaO$_2$.8H$_2$O were mixed and ground in a mortor. The preparation proceeded according to Example II.

Analysis showed an effervescent oxygen content of 10% and a peroxide oxygen content of 7%.

EXAMPLE IV (LiOH)$_2$.LiBO$_5$

One-tenth mole of LiOH and 0.05 mole of LiBO$_2$ were ground and mixed in a mortor. The mixture was transferred to a thickwalled glass flask which was placed in an ice bath (−5° C.). One-half mole of a 30% aqueous H$_2$O$_2$ was slowly added. Stirring by a magnetic stirrer was started and was continued for one hour while the temperature was maintained at −5° C. The temperature was then raised to 8° C. and a vacuum (final vacuum, 3–5 μHg) was applied until a constant weight, i.e., dryness was obtained. The temperature was allowed to rise to 23° C. and the vacuum drying was continued for 8 days.

Analysis showed an effervescent oxygen content of 20% and a peroxide oxygen content of 10% by weight. The yield of (LiOH)$_2$.LiBO$_5$ was 95%.

EXAMPLE V (LiOH.Li$_2$O$_2$)$_2$.Li$_3$B$_3$O$_{13}$

To 0.15 moles (3.6 g) of LiOH, 0.05 moles (3.1 g) of boric acid was added. After grinding in a mortor, the mixture was placed in an ice bath. Forty grams (0.35 mole) of 30% aqueous hydrogen peroxide solution was slowly added. The solution was allowed to stand for at least one hour at 0° C. with constant stirring. The temperature was raised to 8° C. and a low vacuum (final vacuum 3 μHg) was applied the sample was dry. An analysis at this point showed that the material had an effervescent oxygen content of 0.5 weight percent and a peroxide oxygen content of 28 weight percent.

Vacuum (final vacuum, 4 μHg) was applied and was continued at 8° C. for 8 days. The temperature was allowed to rise to 25° C. while the vacuum was continued. The vacuum was held for an additional 48 hours after the temperature reached 25° C.

Analysis of the product showed an effervescent oxygen content of 16 weight % and a peroxide oxygen content of 15 weight %. The yield was 86%.

EXAMPLE VI $(Li_2O_2)_2.Li_2B_2O_8$

One-fifth mole of $Li_2O_2$ and one-tenth mole of $H_3BO_3$ are ground and mixed in a mortor. The mixture was transferred to a thick-walled flask which was placed in an ice bath ($-5°$ C.). A 30% aqueous solution of $H_2O_2$ in an amount of 0.8 mole was added. The mixture was stirred for an hour while the temperature was maintained at $-5°$ C. The temperature was then raised to 8° C. and a vacuum (final vacuum, 5 μHg) was placed on the mixture until a constant weight was otained. Nine-tenths mole of a 50% aqueous $H_2O_2$ solution was added. A vacuum (final vacuum, 5 μHg) was reapplied for 8 days. Then the temperature was allowed to rise slowly (48 hours) to 23° C.

Analysis showed a yield of about 75% with an effervescent oxygen content of weight 18% and a peroxide oxygen content of weight 11%.

To demonstrate the practical utility of the present invention the following examples are given. It is understood that the examples are given by way of demonstration and are not intended to limit the specification or claims to follow.

The apparatus used for the following examples is schematically shown in FIG. 1. The apparatus operates by admitting carbon dioxide through a control valve 10. Nitrogen may be introduced into the system through control valve 12. Air is then admitted through a mainline-pressure reducer and filter 14 and is controlled by a pressure regulator 16. The gas passes through a precision bore flowmeter 18 and is controlled by a two-way valve 20 which normally passes the mixture to the 250 ml gas washing bottle 24 but may also be used as a by-pass to $CO_2$- analyzer 40. The gas washing bottle 24 is in a water bath 22 which is thermostated at 37° C. Washing bottle 24 saturates the gas mixture with distilled water which fills the bottle three-fourths full. From the washing bottle, the gas mixture passes to spray trap 26 wherein glass beads or glass wool provides a surface for the condensation of excess water and further insures uniformity of temperature, and then passes through sample holder 28 which contains a sample of an air revitalization material resting on a glass fritted disc 30 and a quantity of packing 32, e.g., glass wool on top of the sample. The pressure drop through the sample holder 28 is measured by manometer 27 and the temperature of the sample is measured by thermocouple 29. The effluent gas mixture then passes through stream splitter 34 which divides the effluent into two portions. The major portion passes through union 46 while the minor portion passes through a needle valve 36 to a Liston-Becker $CO_2$ analyzer 40 and through a Pauling Meter 42. Connected to the analyzer 40 is a recorder 44.

The gas pressure drop through the Liston-Becker analyzer is maintained at 2 cm of water maximum by a water-filled pressure relief 38. After passing through the $CO_2$ analyzer, the minor portion recombines with the major portion at union 46. The wet test meter 48, therefore, measures the entire gas flow. The $CO_2$ concentration of the gas stream is periodically checked by diverting the gas momentarily through the sample by-pass to the $CO_2$ analyzer 40 and Pauling Meter 42.

FIG. 2 illustrates the amount of carbon dioxide absorption and oxygen evolution as a function of time for $(LiOH.Li_2O_2)_2.Li_3B_3O_{13}$ using a flow rate of 500 cc/min of 4% $CO_2$ in air at 37° C., with a relative humidity of 100%, and at 1 atmosphere pressure. The pellet size was 20 to 30 mesh.

Other compounds were tested for oxygen evolution and carbon dioxide absorption. All of the compounds were tested under the same conditions as those used in FIG. 2. The results of these test are summarized in TABLE I and are based on the total weight of the sample tested. Each compound was tested several times and the range of the result is given in TABLE I.

TABLE I

| COMPOUND | WT. % $O_2$ EVOLVED | WT. % $CO_2$ ABSORBED |
|---|---|---|
| $Ca_2ZrO_8$ | 18–20 | 1–2 |
| $Ca(OH)_2Ca(O_2)_2 . NaBO_5$ | 30–32 | 5–8 |
| $(Li_2O_2)_2 . Li_2B_2O_8$ | 25–30 | 18–20 |
| $(LiOH)_2LiBO_5$ | 28–30 | 17–20 |
| $Ca_2TiO_8$ | 17–20 | 1–3 |
| $(LiOH . Li_2O_2)_2Li_2B_3O_{13}$ | 28–32 | 18–20 |

Other compounds were tested for oxygen evolution only. These results are summarized in TABLE II.

TABLE II

| COMPOUND | WT. % $O_2$ EVOLVED |
|---|---|
| $Na_2O_2 . LiBO_5$ | 27–30 |
| $Na_2O_2 . Li_3B_3O_{13}$ | 25–30 |
| $Na_2O_2 . NaBO_5$ | 20–25 |
| $Na_2O_2 . NaBO_5$ | 18–23 |

As the results from FIG. 1 and TABLE I show, the compounds of the present invention are excellent sources of oxygen and, when complexed with a base, the compounds are excellent carbon dioxide absorbers. These results, coupled with the known properties and characteristics of the compounds, e.g., low toxicity, clearly demonstrate the utility of these compounds as sources of oxygen in emergency breathing devices and other devices requiring an artifical source of oxygen.

TABLE II further demonstrates the oxygen producing capability of the compounds embraced by the present invention. As excellent oxygen-producing compounds, these compounds have many additional uses besides being excellent air-revitalization materials.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An oxygen-generating compound of the formula: $A_m.Z_n (D_xO_yH_z)_p$ wherein A is a base having a lithium, magnesium, or calcium cation and an oxide, hydroxide, peroxide, or superoxide anion; Z is selected from the group consisting of calcium, lithium, sodium, and potassium; $(D_xO_yH_z)$ is selected from the group consisting BO$_5$, B$_2$O$_8$, BO$_5$H, B$_3$O$_{13}$, TiO$_8$, and ZrO$_8$; m is 0 or 1; n is an integer from 1 to 4; and p is 1 or 2.

2. The compound of claim 1 wherein (D$_o$O$_y$.H$_2$) is selected from the group consisting of BO$_5$, B$_2$O$_8$, and B$_3$O$_{13}$.

3. The compound of claim 2 which is selected from the group consisting of Ca(OH)$_2$Ca(O$_2$)$_2$.NaBO$_5$, (LiOH)$_2$.LiBO$_5$, (LiOH.Li$_2$O$_2$)$_2$.Li$_3$B$_3$O$_{13}$, CaO$_2$.LiBO$_5$, CaO$_2$.Li$_2$B$_2$O$_8$, Na$_2$O$_2$.LiBO$_5$, and Na$_2$O$_2$.Li$_3$B$_3$O$_{13}$.

4. The compound of claim 1 wherein (D$_x$O$_y$H$_z$)$_p$ is selected from the group consisting of BO$_5$, B$_2$O$_8$, BO$_5$H, and B$_3$O$_{13}$.

5. The compound of claim 4 wherein Z is lithium or sodium.

6. An oxygenated-atmosphere-revitalization composition comprising a compound of claim 1.

7. An oxygenated-atmosphere-revitalization composition comprising a compound of claim 4.

8. The composition of claim 7 which further comprises KO$_2$.

9. An oxygenated-atmosphere-revitalization compositions comprising a compound of claim 2.

10. The composition of claim 9 which further comprises KO$_2$.

11. An oxygenated-atmosphere-revitalization composition comprising a compound of claim 5.

12. The composition of claim 11 which further comprises KO$_2$.

13. A method of revitalizing an oxygenated atmosphere which comprises passing said atmosphere through the composition of claim 9.

14. A method of revitalizing an oxygenated atmosphere which comprises passing said atmosphere through the composition of claim 11.

* * * * *